US010466111B2

(12) United States Patent
Jones et al.

(10) Patent No.: US 10,466,111 B2
(45) Date of Patent: Nov. 5, 2019

(54) SYSTEMS AND METHODS FOR MONITORING TEMPERATURE OR MOVEMENT OF MERCHANDISE

(71) Applicant: Walmart Apollo, LLC, Bentonville, AR (US)

(72) Inventors: Nicholaus A. Jones, Fayetteville, AR (US); Matthew A. Jones, Bentonville, AR (US); Robert J. Taylor, Rogers, AR (US); Aaron J. Vasgaard, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 183 days.

(21) Appl. No.: 15/499,361

(22) Filed: Apr. 27, 2017

(65) Prior Publication Data
US 2017/0322090 A1    Nov. 9, 2017

Related U.S. Application Data

(60) Provisional application No. 62/332,145, filed on May 5, 2016.

(51) Int. Cl.
| | | |
|---|---|---|
| *G01K 1/02* | (2006.01) | |
| *G01K 13/00* | (2006.01) | |
| *G06K 19/06* | (2006.01) | |

(52) U.S. Cl.
CPC ............ *G01K 1/022* (2013.01); *G01K 13/00* (2013.01); *G06K 19/06028* (2013.01); *G01K 2207/04* (2013.01)

(58) Field of Classification Search
CPC .... G06Q 10/08; G06Q 10/087; G06Q 20/203; G06K 7/10366; G06K 19/0717;
(Continued)

(56) References Cited

U.S. PATENT DOCUMENTS

| 5,369,995 A | 12/1994 | Scheinbeim |
|---|---|---|
| 5,621,162 A | 4/1997 | Yun |

(Continued)

FOREIGN PATENT DOCUMENTS

| CA | 2469699 | 1/2016 |
|---|---|---|
| CN | 1789992 | 6/2006 |

(Continued)

OTHER PUBLICATIONS

PCT; App. No. PCT/US2017/030355; International Search Report and Written Opinion dated Jul. 19, 2017.

(Continued)

*Primary Examiner* — Gail Kaplan Verbitsky
(74) *Attorney, Agent, or Firm* — Fitch, Even, Tabin & Flannery LLP (57) ABSTRACT

In some embodiments, apparatuses and methods are provided herein useful to monitoring temperature or movement of merchandise during and after transport of the merchandise. Some of these embodiments include systems for monitoring the temperature of merchandise items comprising: a temperature sensor disposed at or near one or more merchandise items; a control circuit operatively coupled to the temperature sensor, the control circuit configured to: read temperature measurements from the temperature sensor at predetermined time intervals; generate and encode a barcode with data representing a first temperature measurement; and update and encode the barcode with data representing the first temperature measurement and one or more subsequent temperature measurements; and an interface operatively coupled to the control circuit and configured to display the updated barcode.

19 Claims, 3 Drawing Sheets

(58) Field of Classification Search
CPC .. G06K 19/06028; G06K 1/024; G06K 1/022; G06K 13/00; G06K 19/0723; G06K 7/10544
USPC .................................................. 340/870.17
See application file for complete search history.

(56) References Cited

U.S. PATENT DOCUMENTS

| | | | |
|---|---|---|---|
| 5,671,362 A | 9/1997 | Cowe | |
| 5,791,497 A | 8/1998 | Campbell | |
| 5,835,012 A | 11/1998 | Wilk | |
| 6,204,763 B1 | 3/2001 | Sone | |
| 6,285,282 B1 | 9/2001 | Dorenbosch et al. | |
| 6,294,997 B1 | 9/2001 | Paratore et al. | |
| 6,296,187 B1 | 10/2001 | Shearer | |
| 6,386,454 B2* | 5/2002 | Hecht | G06K 7/14 235/462.16 |
| 6,435,002 B1 | 8/2002 | Briggs | |
| 6,497,367 B2* | 12/2002 | Conzola | G06Q 30/06 235/462.01 |
| 6,549,135 B2 | 4/2003 | Singh | |
| 6,600,418 B2 | 7/2003 | Francis | |
| 6,624,752 B2 | 9/2003 | Klitsgaard | |
| 6,779,722 B1 | 8/2004 | Mason | |
| 6,847,447 B2 | 1/2005 | Ozanich | |
| 6,865,516 B1 | 3/2005 | Richardson | |
| 6,965,871 B1 | 11/2005 | Szabo | |
| 6,970,100 B2 | 11/2005 | Lovegreen | |
| 6,982,640 B2 | 1/2006 | Lindsay | |
| 7,004,621 B2 | 2/2006 | Roberts | |
| 7,027,958 B2 | 4/2006 | Singh | |
| 7,057,495 B2 | 6/2006 | Debord | |
| 7,065,501 B1 | 6/2006 | Brown | |
| 7,148,803 B2 | 12/2006 | Bandy | |
| 7,185,810 B2 | 3/2007 | White | |
| 7,245,386 B2 | 7/2007 | Philipps | |
| 7,248,147 B2 | 7/2007 | Debord | |
| 7,271,720 B2 | 9/2007 | Tabe | |
| 7,271,724 B2 | 9/2007 | Goyal | |
| 7,298,257 B2 | 11/2007 | Suzuki | |
| 7,347,361 B2 | 3/2008 | Lovett | |
| 7,372,003 B2 | 5/2008 | Kates | |
| 7,434,724 B2 | 10/2008 | Lane | |
| 7,455,225 B1 | 11/2008 | Hadfield | |
| 7,487,913 B2 | 2/2009 | Adema | |
| 7,495,558 B2 | 2/2009 | Pope | |
| 7,543,741 B2 | 6/2009 | Lovett | |
| 7,560,013 B2 | 7/2009 | Shekarriz | |
| 7,673,464 B2 | 3/2010 | Bodin | |
| 7,675,424 B2 | 3/2010 | Debord | |
| 7,757,947 B2 | 7/2010 | Reznik | |
| 7,775,130 B2 | 8/2010 | Harish | |
| 7,792,711 B2 | 9/2010 | Swafford, Jr. | |
| 7,796,038 B2 | 9/2010 | Batra | |
| 7,810,720 B2 | 10/2010 | Lovett | |
| 7,954,712 B2 | 6/2011 | Babcock | |
| 7,960,176 B2 | 6/2011 | Louvet | |
| 7,978,060 B2 | 7/2011 | Mandava | |
| 8,072,605 B2 | 12/2011 | Costa | |
| 8,102,101 B2 | 1/2012 | Giurgiutiu | |
| 8,112,303 B2 | 2/2012 | Eglen | |
| 8,203,603 B2 | 6/2012 | Harbert | |
| 8,279,065 B2 | 10/2012 | Butler | |
| 8,306,871 B2 | 11/2012 | Farmer | |
| 8,334,970 B2 | 12/2012 | Wildenbeest | |
| 8,354,927 B2 | 1/2013 | Breed | |
| 8,412,590 B2 | 4/2013 | Elliott | |
| 8,447,665 B1 | 5/2013 | Schoenharl | |
| 8,682,760 B2 | 3/2014 | Cameo | |
| 8,786,407 B2 | 7/2014 | Liu | |
| 8,803,970 B2 | 8/2014 | Weisensale | |
| 8,870,453 B2 | 10/2014 | Branch | |
| 8,947,234 B2 | 2/2015 | Doan | |
| 8,994,508 B2 | 3/2015 | Dacus | |
| 9,024,755 B2 | 5/2015 | Fuhr | |
| 9,030,295 B2 | 5/2015 | Allen | |
| 9,031,990 B2 | 5/2015 | Scott | |
| 9,218,585 B2 | 12/2015 | Gupta | |
| 9,244,147 B1 | 1/2016 | Soundararajan | |
| 9,275,361 B2 | 3/2016 | Meyer | |
| 9,316,595 B2 | 4/2016 | Wakita | |
| 9,366,483 B2* | 6/2016 | Eckhoff | F28D 15/02 |
| 9,443,217 B2 | 9/2016 | Iyer | |
| 9,449,208 B2 | 9/2016 | Luk | |
| 9,514,323 B2 | 12/2016 | Mehring | |
| 9,557,224 B2 | 1/2017 | Eisenstadt | |
| 9,710,754 B2 | 7/2017 | Kaye | |
| 9,789,518 B2 | 10/2017 | Iino | |
| 9,811,632 B2 | 11/2017 | Grabiner | |
| 9,824,298 B1 | 11/2017 | Krishnan | |
| 9,835,498 B2 | 12/2017 | Haarer | |
| 9,888,214 B2* | 2/2018 | Bateman | H04N 7/181 |
| 9,915,638 B2 | 3/2018 | Pakstaite | |
| 10,009,667 B2 | 6/2018 | Taylor | |
| 10,060,798 B1 | 8/2018 | Riscalla | |
| 10,176,451 B2* | 1/2019 | Nemet | G06K 17/00 |
| 2003/0088442 A1* | 5/2003 | Michael | G06Q 10/087 705/3 |
| 2003/0214387 A1 | 11/2003 | Giaccherini | |
| 2004/0018641 A1 | 1/2004 | Goldsmith | |
| 2004/0069046 A1 | 4/2004 | Sunshine | |
| 2004/0148117 A1 | 7/2004 | Kirshenbaum | |
| 2004/0154739 A1 | 8/2004 | Shanahan | |
| 2004/0204881 A1 | 10/2004 | Mayer | |
| 2004/0226392 A1 | 11/2004 | McNally | |
| 2005/0060246 A1 | 3/2005 | Lastinger | |
| 2005/0149470 A1 | 7/2005 | Fujie | |
| 2005/0197912 A1 | 9/2005 | Wittmer | |
| 2005/0203790 A1 | 9/2005 | Cohen | |
| 2005/0222889 A1 | 10/2005 | Lai | |
| 2005/0228712 A1 | 10/2005 | Bornstein | |
| 2006/0006987 A1 | 1/2006 | Hashimoto | |
| 2006/0071774 A1 | 4/2006 | Brown | |
| 2006/0080819 A1 | 4/2006 | McAllister | |
| 2006/0097875 A1 | 5/2006 | Ott | |
| 2006/0238307 A1 | 10/2006 | Bauer | |
| 2006/0244718 A1* | 11/2006 | Hiddink | G09F 9/372 345/156 |
| 2007/0050070 A1 | 3/2007 | Strain | |
| 2007/0050271 A1 | 3/2007 | Ufford | |
| 2007/0064765 A1 | 3/2007 | Solie | |
| 2007/0067177 A1 | 3/2007 | Martin | |
| 2007/0067203 A1 | 3/2007 | Gil | |
| 2007/0069867 A1 | 3/2007 | Fleisch | |
| 2007/0076779 A1 | 4/2007 | Haarer | |
| 2007/0156261 A1 | 7/2007 | Caldwell | |
| 2007/0176773 A1 | 8/2007 | Smolander | |
| 2007/0221727 A1 | 9/2007 | Reznik | |
| 2008/0001752 A1* | 1/2008 | Bruns | G06Q 10/08 340/572.1 |
| 2008/0052201 A1 | 2/2008 | Bodin | |
| 2008/0067227 A1 | 3/2008 | Poss | |
| 2008/0073431 A1 | 3/2008 | Davis | |
| 2008/0103944 A1 | 5/2008 | Hagemann | |
| 2008/0186175 A1* | 8/2008 | Stern | B41J 3/36 340/572.1 |
| 2008/0292759 A1 | 11/2008 | Palmer | |
| 2008/0294488 A1 | 11/2008 | Gupta | |
| 2009/0027213 A1 | 1/2009 | Debord | |
| 2009/0040063 A1 | 2/2009 | Yearsley | |
| 2009/0058644 A1 | 3/2009 | French | |
| 2009/0083054 A1 | 3/2009 | Koo | |
| 2009/0144122 A1 | 6/2009 | Ginsberg | |
| 2009/0261974 A1 | 10/2009 | Bailey | |
| 2009/0322481 A1 | 12/2009 | Marr, III | |
| 2010/0006646 A1 | 1/2010 | Stiller | |
| 2010/0007464 A1 | 1/2010 | McTigue | |
| 2010/0042369 A1 | 2/2010 | Mian | |
| 2010/0065632 A1 | 3/2010 | Babcock | |
| 2010/0101317 A1 | 4/2010 | Ashrafzadeh | |
| 2010/0138281 A1 | 6/2010 | Zhang | |
| 2011/0029413 A1 | 2/2011 | Ben-Tzur | |
| 2011/0035326 A1 | 2/2011 | Sholl | |

(56) References Cited

U.S. PATENT DOCUMENTS

| | | | |
|---|---|---|---|
| 2011/0068921 A1* | 3/2011 | Shafer | G06K 7/0008 340/571 |
| 2011/0301903 A1 | 12/2011 | Humbert | |
| 2012/0101876 A1 | 4/2012 | Turvey | |
| 2012/0161967 A1 | 6/2012 | Stern | |
| 2012/0264446 A1* | 10/2012 | Xie | G01C 22/00 455/456.1 |
| 2012/0267541 A1 | 10/2012 | Utukuri | |
| 2012/0310853 A1* | 12/2012 | Aldstadt | G06Q 10/08 705/333 |
| 2013/0117053 A2 | 5/2013 | Campbell | |
| 2013/0176115 A1 | 7/2013 | Puleston | |
| 2013/0214797 A1 | 8/2013 | Gruden | |
| 2013/0218511 A1 | 8/2013 | Mager | |
| 2013/0235206 A1 | 9/2013 | Smith | |
| 2013/0282522 A1 | 10/2013 | Hassan | |
| 2014/0138440 A1 | 5/2014 | D'Ambrosio | |
| 2014/0201041 A1 | 7/2014 | Meyer | |
| 2014/0297487 A1 | 10/2014 | Bashkin | |
| 2014/0313055 A1 | 10/2014 | Warkentin | |
| 2014/0316875 A1 | 10/2014 | Tkachenko | |
| 2014/0330407 A1 | 11/2014 | Corder | |
| 2015/0015373 A1* | 1/2015 | Mongrenier | G06F 19/3462 340/10.1 |
| 2015/0021401 A1* | 1/2015 | Rajagopal | G06K 19/06046 235/488 |
| 2015/0022313 A1 | 1/2015 | Maier | |
| 2015/0041616 A1 | 2/2015 | Gentile | |
| 2015/0048938 A1 | 2/2015 | Tew | |
| 2015/0084100 A1 | 3/2015 | Sablong | |
| 2015/0186840 A1 | 7/2015 | Torres | |
| 2015/0192475 A1 | 7/2015 | Eisenstadt | |
| 2015/0338846 A1 | 11/2015 | Boivin | |
| 2016/0012337 A1 | 1/2016 | Kaye | |
| 2016/0026032 A1 | 1/2016 | Moore | |
| 2016/0034907 A1 | 2/2016 | Worrall | |
| 2016/0048798 A1 | 2/2016 | Meyer | |
| 2016/0063367 A1* | 3/2016 | Cai | G06Q 10/10 235/494 |
| 2016/0189087 A1* | 6/2016 | Morton | G06Q 10/083 705/337 |
| 2016/0239794 A9* | 8/2016 | Shafer | G06Q 10/087 |
| 2016/0283904 A1 | 9/2016 | Siegel | |
| 2016/0314514 A1 | 10/2016 | High | |
| 2016/0350715 A1 | 12/2016 | Minvielle | |
| 2017/0039194 A1* | 2/2017 | Tschetter | G06F 16/93 |
| 2017/0039511 A1 | 2/2017 | Corona | |
| 2017/0059391 A1 | 3/2017 | Ademe | |
| 2017/0074921 A1* | 3/2017 | Uota | G01R 31/42 |
| 2017/0102694 A1 | 4/2017 | Enver | |
| 2017/0116565 A1 | 4/2017 | Feiner | |
| 2017/0122771 A1 | 5/2017 | Keal | |
| 2017/0255901 A1 | 9/2017 | Bermudez Rodriguez | |
| 2017/0269601 A1 | 9/2017 | Jones | |
| 2017/0344934 A1 | 11/2017 | Millhouse | |
| 2017/0344935 A1 | 11/2017 | Mattingly | |
| 2018/0007453 A1 | 1/2018 | Taylor | |
| 2018/0045700 A1 | 2/2018 | Biermann | |
| 2018/0078992 A1 | 3/2018 | High | |
| 2018/0096175 A1* | 4/2018 | Schmeling | B29C 64/10 |
| 2018/0143131 A1 | 5/2018 | Choi | |
| 2018/0144430 A1 | 5/2018 | Millhouse | |
| 2018/0180492 A1* | 6/2018 | Ribi | C09B 57/10 |
| 2018/0195869 A1 | 7/2018 | High | |
| 2018/0211208 A1 | 7/2018 | Winkle | |
| 2018/0217118 A1 | 8/2018 | Payne | |
| 2018/0270631 A1 | 9/2018 | High | |
| 2018/0279023 A1 | 9/2018 | Taylor | |
| 2018/0341905 A1 | 11/2018 | Johnsen | |

FOREIGN PATENT DOCUMENTS

| | | | |
|---|---|---|---|
| CN | 201314907 | 9/2009 | |
| CN | 202306566 | 7/2012 | |
| CN | 102930649 | 2/2013 | |
| CN | 203275285 | 11/2013 | |
| CN | 103543703 | 1/2014 | |
| CN | 103593746 | 2/2014 | |
| CN | 104036354 | 9/2014 | |
| CN | 204010264 | 12/2014 | |
| CN | 104749329 | 7/2015 | |
| CN | 204514846 | 7/2015 | |
| CN | 105444504 | 3/2016 | |
| CN | 106408173 | 2/2017 | |
| CN | 106600286 | 4/2017 | |
| EP | 1221613 | 7/2002 | |
| EP | 1374688 | 1/2004 | |
| EP | 2165298 | 3/2010 | |
| EP | 2509412 A1 * | 10/2012 | A01N 1/0252 |
| EP | 2835078 | 2/2015 | |
| JP | 2008004133 A * | 1/2008 | |
| JP | 2013068547 | 4/2013 | |
| WO | 2001023256 | 4/2001 | |
| WO | 2003098175 | 11/2003 | |
| WO | 2012125960 | 9/2012 | |
| WO | 2013174983 | 11/2013 | |
| WO | 2014059048 | 4/2014 | |
| WO | 2015061429 | 4/2015 | |
| WO | 2015066594 | 5/2015 | |

OTHER PUBLICATIONS

U.S. Appl. No. 16/036,456, dated Jul. 16, 2018. Ckristian Velez.
U.S. Appl. No. 16/112,974, dated Aug. 27, 2018, Joshua Bohling.
Compact.net; "Inspection Planning / Quality Inspection / SPC / LIMS"; https://www.caq.de/en/Software/InspectionPlanning_QualityInspection_SPC; available at least as early as Jan. 27, 2017; pp. 1-4.
Eom, Ki-Hwan, et al.; "The Meat Freshness Monitoring System Using the Smart RFID Tag"; International Journal of Distributed Sensor Networks, vol. 2014; http://journals.sagepub.com/doi/10.1155/2014/591812; Jul. 9, 2014; pp. 1-10.
IQA Team; "Material Inspection Using a Cloud Software"; http:Mqalims.com/wp-content/uploads/2015/02/MAT_INSP.pdf; available at least as early as Jan. 27, 2017; pp. 1-5.
MIPSIS; "Quality Control Inspection Software"; http://www.mipsis.com/QualityInspectionSoftware.html; available at least as early as Jan. 27, 2017; pp. 1-3.
QC One; "Inspect. Report. Analyze. Quality Control Software for Fresh Produce"; http://qcone.com/en/; available at least as early as May 29, 2017; pp. 1-2.
Softexpert; "SE Inspection Incoming/Outgoing Goods Inspection and Supplier Management"; https://softexpert.com/inspection-evaluation-goods.php; available at least as early as Jan. 27, 2017; pp. 1-3.
3M; "3M MonitorMark Time Temperature Indicators"; https://www.3m.com/3M/en_US/company-us/all-3m-products/~/MONMARK-3M-MonitorMark-Time-Temperature-Indicators/?N=5002385+3293785721&rt=rud; Available at least as early as Feb. 7, 2019; pp. 1-4.
Agrofresh; "FreshCloud™ Storage Insights helps you monitor fruit in storage for added peace of mind"; https://www.agrofresh.com/technologies/freshcloud/storage-insights/; Available at least as early as Feb. 7, 2019; pp. 1-4.
Ahearn, Brianna; "Kroger Wins for Food Temperature Innovation"; https://www.retailsupplychaininsights.com/doc/kroger-wins-for-food-temperature-innovation-0001; Jun. 4, 2015; pp. 1-2.
Ambrosus; "Decentralised IoT Networks for Next-Generation Supply Chains"; https://ambrosus.com/#home; Available at least as early as Feb. 7, 2019; pp. 1-12.
BT9 Intelligent Supply Chain Solutions; "Multi Segment, Real Time, Cold Chain Perishable Information"; http://www.bt9-tech.com; Published 2018; pp. 1-6.
Business Wire; "Emerson Expands Global Capabilities in Fresh Food Monitoring with Acquisitions of Locus Traxx and PakSense"; https://www.businesswire.com/news/home/20160830005136/en/Emerson-Expands-Global-Capabilities-Fresh-Food-Monitoring; Aug. 30, 2016; pp. 1-2.

(56) References Cited

OTHER PUBLICATIONS

Cao, Jordan; "Intelligent Container—powered by SAP HANA"; https://blogs.saphana.com/2018/09/27/intelligent-container-powered-sap-hana/; Sep. 27, 2018; pp. 1-5.
Carrefour Group; "Carrefour launches Europe's first food blockchain"; http://www.carrefour.com/current-news/carrefour-launches-europes-first-food-blockchain; Mar. 6, 2018; pp. 1-2.
De Troch, Stefan; "Item-level cold chain monitoring, another cool NFC solution"; https://blog.nxp.com/internet-of-things-2/item-level-cold-chain-monitoring-another-cool-nfc-solution; Aug. 30, 2016; pp. 1-5.
Digi; "Digi Honeycomb Keeping food safe just got easier and cheaper. Digi Honeycomb lets you monitor your entire Cold Chain System"; https://s3.amazonaws.conn/telusdigital-marketplace-production/iot/user-content/product/64aa-o.pdf; Available at least as early as Feb. 7, 2019; pp. 1-2.
Dji Ferntech; "Drones for Agriculture"; https://www.djistore.co.nz/agriculture; Available at least as early as Feb. 7, 2019; pp. 1-13.
Ecoark Holdings, Inc.; "Ocean Mist Farms Selects Zest Fresh to Optimize Freshness Management"; https://www.globenewswire.com/news-release/2018/12/04/1661680/0/en/Ocean-Mist-Farms-Selects-Zest-Fresh-to-Optimize-Freshness-Management.html; Dec. 4, 2018; pp. 1-3.
Emerson; "ProAct Services and ProAct Transport"; https://www.emerson.com/en-us/commercial-residential/proact; Available at least as early as Feb. 7, 2019; pp. 1-4.
Emerson; "Real-Time Temperature & Location Trackers"; https://climate.emerson.com/en-us/products/controls-monitoring-systems/cargo-tracking-monitoring/trackers; Available at least as early as Feb. 7, 2019; pp. 1-4.
Emerson; "Supply Chain Data Loggers"; https://climate.emerson.com/en-us/products/controls-monitoring-systems/cargo-tracking-monitoring/loggers; Available at least as early as Feb. 7, 2019; pp. 1-4.
Fast Casual; "Wireless temperature-monitoring, tracking solution available for shipping perishable goods"; https://www.fastcasual.com/news/wireless-temperature-monitoring-and-tracking-solution-now-available-for-shipping-perishable-goods/; Aug. 15, 2017; pp. 1-10.
Food and Agriculture Organization of the United Nations; "Flying robots for food security"; http://www.fao.org/zhc/detail-events/en/c/428256; Aug. 10, 2016; pp. 1-3.
Freshai; "AI-powered waste reduction for smart food businesses."; http://freshai.farmstead.app.com/; Available as early as Feb. 7, 2019; pp. 1-5.
Freshfruitportal.com; "Zest Labs fights food waste by routing pallets according to real-time freshness"; https://www.freshfruitportal.com/news/2018/07/19/technology-zest-labs-food-waste-profits-sensors; Jul. 19, 2018; pp. 1-5.
Friedman, Phil; "AI, machine learning, and more efficient routing"; https://www.omnitracs.com/blog/ai-machine-learning-and-more-efficient-routing; Jun. 28, 2018; pp. 1-6.
Gabbett, Rita Jane; "Amazon using artificial intelligence to monitor food safety issues"; http://www.micausa.org/amazon-using-artificial-intelligence-monitor-food-safety-issues/; May 9, 2018; pp. 1-3.
Grand View Research; "Cold Chain Market Size Worth $447.50 Billion by 2025 | CAGR: 15.1%"; https://www.grandviewresearch.com/press-release/global-cold-chain-market; Mar. 2019; pp. 1-10.
Greenwalt, Megan; "Acquisition Leads to New, Fresh Food Waste Solution"; https://www.waste360.com/mergers-and-acquisitions/acquisition-leads-new-fresh-food-waste-solution; Aug. 15, 2018; pp. 1-6.
Hagen, Christian et al.; "A Fresh Look: Perishable Supply Chains Go Digital"; https://www.atkearney.com/operations-performance-transformation/article?/a-fresh-look-perishable-supply-chains-go-digital; Available at least as early as Feb. 7, 2019; pp. 1-22.
Harvard Business Review; "How Blockchain Will Accelerate Business Performance and Power the Smart Economy"; https://hbr.org/sponsored/2017/10/how-blockchain-will-accelerate-business-performance-and-power-the-smart-economy; Oct. 27, 2017; pp. 1-8.

Hsu, Jenny W.; "Freshippo Customers Can Track Farm-To-Shelf Journey for Food"; https://www.alizila.com/hema-food-tracking/; Aug. 7, 2018; pp. 1-6.
Husseini, Talal; "Walmart's 'Eden' artificial intelligence technology to inspect fresh food for spoilage"; https://www.foodprocessing-technology.com/news/walmarts-eden-artificial-intelligence-technology-inspect-fresh-food-spoilage; Mar. 2, 2018; pp. 1-4.
IBM; "Take your food data further with Fresh Insights for IBM Food Trust"; https://www.ibm.com/blockchain/solutions/food-trust/freshness; Available at least as early as Feb. 7, 2019; pp. 1-3.
Impact Vision; "Non-invasive, real time food quality information"; https://www.impactvi.com/; Available at least as early as Feb. 7, 2019; pp. 1-18.
Impinj; "Hy-Vee Grocery Automates Cold Chain Monitoring"; https://www.impinj.com/library/customer-stories/hy-vee-cold-chain-monitoring-increases-shelf-life/; Available as early as Feb. 7, 2019; pp. 1-3.
Infratab; "Products"; https://infratab.com/products/; Available at least as early as Feb. 7, 2019; pp. 1-2.
Intel; "Intelligent Dynamic Store Merchandising Solution Cuts Losses on Perishables and Raises Brand Awareness"; Available at least as early as Feb. 7, 2019; pp. 1-12.
Kroger; "Kroger Gets HarvestMark Allows consumers to trace the origin of salads"; https://www.cspdailynews.com/foodservice/kroger-gets-harvestmark; Oct. 29, 2009; pp. 1-11.
Marvin, Rob; "Blockchain: The Invisible Technology That's Changing the World"; https://in.pcmag.com/amazon-web-services/112363/blockchain-the-invisible-technology-thats-changing-the-world; Aug. 30, 2017; pp. 1-29.
Mazur, Michal; "Six Ways Drones Are Revolutionizing Agriculture"; https://www.technologyreview.com/s/601935/six-ways-drones-are-revolutionizing-agriculture; Jul. 20, 2016; pp. 1-5.
Moorthy, Rahul et al.; "On-Shelf Availability in Retailing"; vol. 116—No. 23; International Journal of Computer Applications; Apr. 2015; pp. 47-51.
Musani, Parvez; "Eden: The Tech That's Bringing Fresher Groceries to You"; https://blog.walmart.com/innovation/20180301/eden-the-tech-thats-bringing-fresher-groceries-to-you; Mar. 1, 2018; pp. 1-4.
My Devices; "Alibaba Cloud and myDevices Partner to Launch Turnkey IoT Solutions in China"; https://mydevices.com/newspost/alibaba-cloud-mydevices-partner-launch-turnkey-iot-solutions-china/; Sep. 11, 2018; pp. 1-3.
Oracle; "Oracle Unveils Business-Ready Blockchain Applications"; https://www.oracle.com/nz/corporate/pressrelease/oow18-oracle-blockchain-applications-cloud-2018-10-23.html; Oct. 23, 2018; pp. 1-4.
Palanza, Rich; "IoT Monitoring: Rapidly Deliver on the Promise of IoT"; https://business.weather.com/blog/iot-monitoring-rapidly-deliver-on-the-promise-of-iot; May 16, 2018; pp. 1-4.
Peterson, Hayley; "Walmart is saving $2 billion with a machine called 'Eden' that inspects food and knows when it will spoil"; https://www.businessinsider.in/walmart-is-saving-2-billion-with-a-machine-called-eden-that-inspects-food-and-knows-when-it-will-spoil/articleshow/63127641.cms; Mar. 1, 2018; pp. 1-12.
Pridevel; "IoT Cold Chain Monitoring"; http://www.pridevel.com/sap-iot-cold-chain-monitoring; Available at least as early as Feb. 7, 2019; pp. 1-3.
Qa; "Carrefour and SGS Launch Visual Trust in China"; https://www.qualityassurancemag.com/article/carrefour-and-sgs-launch-visual-trust-in-china/; Sep. 28, 2017; pp. 1-4.
Ripple News Tech Staff; "Alibaba is Using Blockchain to Improve Consumer Confidence and Fight Food Fraud"; https://ripplenews.tech/2018/05/03/alibaba-is-using-blockchain-to-improve-consumer-confidence-and-fight-food-fraud/; May 3, 2018; pp. 1-7.
Sensefly; "Why Use Agriculture Drones?"; https://www.sensefly.com/industry/agricultural-drones-industry; Available at least as early as Feb. 7, 2019; pp. 1-15.
Sensegrow; "Supply Chain Monitoring with Real-time IoT Platform"; http://www.sensegrow.com/blog/supply-chain-monitoring; May 10, 2018; pp. 1-5.

(56) References Cited

OTHER PUBLICATIONS

Smart Sense; "Supermarket Remote Monitoring Solutions"; https://www.smartsense.co/industries/retail/supermarkets; Available at least as early as Feb. 7, 2019; pp. 1-6.

Smilo; "The latest generation hybrid blockchain platform"; https://smilo.io/files/Smilo_White_Paper_V1.8.1.pdf; Available at least as early as Feb. 7, 2019; pp. 1-33.

Springer, Jon; "Walmart, Kroger join suppliers in blockchain food safety initiative"; https://www.supermarketnews.com/news/walmart-kroger-join-suppliers-blockchain-food-safety-initiative; Aug. 22, 2017; pp. 1-4.

TCS Worldwide; "TCS Cargo Monitoring Solution: Track freshness of perishable cargo"; https://www.tcs.com/cargo-monitoring-solution; Available at least as early as Feb. 7, 2019; pp. 1-7.

TE-FOOD; "TE-FOOD Partners with HALAL TRAIL Bringing Halal Food Companies to the Blockchain"; https://www.reuters.com/brandfeatures/venture-capital/article?id=38153; May 31, 2018; pp. 1-6.

Tech Mahindra; "Cold Chain Monitoring"; https://www.techmahindra.com/services/NextGenSolutions/DES/Solutions/Cold_Chain_Monitoring.aspx; Available at least as early as Feb. 7, 2019; pp. 1-4.

Tech Mahindra; "Farm to fork"; https://www.techmahindra.com/services/NextGenSolutions/DES/Solutions/Farm_to_fork.aspx; Available at least as early as Feb. 7, 2019; pp. 1-2.

Tive; "A Complete Supply Chain Visibility System"; https://tive.co/product; Available at least as early as Feb. 7, 2019; pp. 1-7.

Tive; "Environmental Monitoring for Perishables"; https://tive.co/solution/environmental-monitoring-for-perishables/; Available at least as early as Feb. 7, 2019; pp. 1-5.

Traqtion; "TraQtion's Supply Chain Solution Manages Global Food Supplier Compliance and Audits"; https://www.traqtion.com/documents/TraQtion-Costco.pdf; Available as early as Feb. 7, 2019; pp. 1-2.

Trimble; "Trimble Acquires HarvestMark to Provide Food Traceability and Quality Control"; https://www.prnewswire.com/news-releases/trimble-acquires-harvestmark-to-provide-food-traceability-and-quality-control-300070050.html; Apr. 22, 2015; pp. 1-6.

Tsenso; "The Fresh Index: A Real-Time Shelf Life Indicator"; https://tsenso.com/en/freshindex-instead-of-bestbefore; Available at least as early as Feb. 7, 2019; pp. 1-5.

Verigo; "Introducing Pod Quality Continuous Product Life Data, From Farm to Store"; https://www.farmtoforkfresh.com/; Available at least as early as Feb. 7, 2019; pp. 1-8.

Wageningen Ur Food & Biobased Research; "Food & Biobased Research"; https://www.worldfoodinnovations.com/userfiles/documents/FBR%20Corporate%20Brochure.pdf; Jul. 2014; pp. 1-24.

Whelan, Jenny; "Kelsius to Install FoodCheck Monitoring System in SuperValu and Centra Stores"; https://www.checkout.ie/kelsius-signs-deal-to-put-foodcheck-monitoring-system-in-supervalu-and-centra-stores/; Aug. 6, 2015; pp. 1-4.

Wynne-Jones, Stephen; "Maxima Group Unveils 'Electronic Nose' to Track Freshness"; https://www.esmmagazine.com/maxima-group-unveils-elecrtronic-nose-track-freshness/29589; Jul. 5, 2016; pp. 1-4.

Xinfin; "Enterprise Ready Hybrid Blockchain for Global Trade and Finance"; https://www.xinfin.org; Available at least as early as Feb. 7, 2019; pp. 1-13.

Yiannas, Frank; "How Walmart's SPARK Keeps Your Food Fresh"; https://blog.walmart.com/sustainability/20150112/how-walmarts-spark-keeps-your-food-fresh; Jan. 12, 2015; pp. 1-16.

Zest Labs; "Zest Fresh for Growers, Retailers and Restaurants"; https://www.zestlabs.com/zest-fresh-for-produce/; Available at least as early as Feb. 7, 2019; pp. 1-7.

Bedard, Jean; "Temperature Mapping of Storage Areas"; Technical supplement to Who Technical Report Series, No. 961, 2011; WHO Press, World Health Organization; published on Jan. 2014; pp. 1-24.

Jedermann, Reiner, et al.; "Semi-passive RFID and Beyond: Steps Towards Automated Quality Tracing in the Food Chain"; Inderscience Enterprises Ltd.; Int. J. Radio Frequency Identification Technology and Applications, vol. 1, No. 3; published in 2007; pp. 247-259.

Greis, Noel P.; "Monitoring the 'Cool Chain' Maximizing Shelf Life for Safer Food"; National Science Foundation; published on Dec. 2011; pp. 2-9.

Ryan, John M.; "Guide to Food Safety and Quality During Transportation: Controls, Standards and Practices"; Academic Press; 2014; pp. 29-33.

Yan, Lu, et al.; "The Internet of Things: From RFID to the Next-Generation Pervasive Networked Systems"; Auerbach Publications Boston, MA, USA; 2008; pp. 1-32.

* cited by examiner

SYSTEMS AND METHODS FOR MONITORING TEMPERATURE OR MOVEMENT OF MERCHANDISE

CROSS-REFERENCE TO RELATED APPLICATION

This application claims the benefit of U.S. Provisional Application No. 62/332,145, filed May 5, 2016, which is incorporated herein by reference in its entirety.

TECHNICAL FIELD

This invention relates generally to monitoring the temperature or movement of merchandise items, and more particularly, to monitoring the temperature or movement of merchandise items during transport of the merchandise.

BACKGROUND

In the retail setting, one challenge is monitoring the temperature data of refrigerated or frozen perishable merchandise. More specifically, when merchandise is being delivered by a delivery vehicle, it is generally desirable to monitor the temperature data of perishable merchandise being transported in the delivery vehicle. It is also generally desirable to continue to monitor the temperature data after delivery and during storage in a shopping facility. As should be evident, any perishable merchandise in an environment that exceeds certain temperature thresholds, such as being too warm, may defrost or deteriorate to a degree that its shelf life is reduced or it needs to be discarded. So, it is desirable to monitor this temperature data.

Further, it is generally desirable to monitor this temperature data during the entire course of transport, rather than just at the end of transport upon delivery. It is possible that the temperature may have exceeded certain temperature thresholds during the course of transport but may be within the desired temperature range at the end of transport. In other words, the temperature may appear acceptable at the end of transport, but it is possible that the temperature was not within an acceptable range at an earlier time prior to the end of transport. Further, it is desirable to continue monitoring temperature to make sure temperature is within the acceptable data after delivery during storage at a shopping facility. Thus, it is desirable to monitor the temperature during the entire course of transport and afterwards in order to establish "cold chain compliance" by the perishable merchandise.

Accordingly, it is desirable to monitor the temperature of perishable items to improve the quality and shelf life of the merchandise sold to customers. Further, it is desirable to develop a low-cost approach for determining cold chain compliance at the end of transport and prior to acceptance of the delivery of the merchandise. It is desirable to develop an approach for determining cold chain compliance at the end of transport that does not necessarily require communication to a computer network, which may increase implementation costs. It is also desirable to develop a similar approach for determining movement of merchandise during transport that may have resulted in damage to the merchandise.

BRIEF DESCRIPTION OF THE DRAWINGS

Disclosed herein are embodiments of systems, apparatuses and methods pertaining to monitoring the temperature or movement of merchandise items involving updating a barcode. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to monitoring temperature data of merchandise items. In one form, a system is disclosed herein for monitoring the temperature of merchandise items comprising: a temperature sensor disposed at or near one or more merchandise items; a control circuit operatively coupled to the temperature sensor, the control circuit configured to: read temperature measurements from the temperature sensor at predetermined time intervals; generate and encode a barcode with data representing a first temperature measurement; and update and encode the barcode with data representing the first temperature measurement and one or more subsequent temperature measurements; and an interface operatively coupled to the control circuit and configured to display the updated barcode.

In some forms, the barcode may be updated after each temperature measurement to add data representing the most recent temperature measurement. Further, the updated barcode may comprise data representing a plurality of sequential temperature measurements taken at the predetermined time intervals from the first temperature measurement to a last temperature measurement. In addition, the interface may comprise an e-ink interface configured to display barcodes and to overwrite a barcode with an updated barcode. Further, the system may comprise a barcode reader configured to read the updated barcode and to transmit it to a computing device in communication with the barcode scanner. In addition, the computing device may be configured to decipher the temperature measurements in the updated barcode and to create a task if one or more of the temperature measurements indicate that a predetermined temperature threshold was exceeded.

In another form, there is disclosed a method for monitoring the temperature of merchandise items comprising: by a temperature sensor at or near one or more merchandise items, measuring temperature at predetermined time intervals; by a control circuit, generating and encoding a barcode with data representing a first temperature measurement; and by a control circuit, updating and encoding the barcode with data representing the first temperature measurement and one or more subsequent temperature measurements.

In some forms, the method may comprise scanning the updated barcode with a barcode reader; and transmitting the updated barcode to a computing device in communication with the barcode reader; and deciphering the temperature measurements in the updated barcode and creating a task if one or more of the temperature measurements indicate that a predetermined temperature threshold was exceeded. Also, the method may include: scanning the updated barcode of the one or more merchandise items at the time of delivery by a delivery vehicle; continuing to measure temperature at predetermined time intervals following delivery; continuing to update and encode the barcode with data representing temperature measurements following delivery; and scanning the updated barcode following movement to a storage area. Moreover, the method may comprise: generating and encoding a first updated barcode with a first barcode device; scanning the first updated barcode at the time of delivery by a delivery vehicle; measuring temperature at predetermined time intervals following delivery; updating and encoding a second barcode with data representing temperature measurements following delivery with a second, different barcode device; and scanning the updated second barcode following movement to a storage area.

In one form, there is disclosed herein a system for monitoring the movement of merchandise items, the system comprising: a sensor disposed on a merchandise item measuring movement; a control circuit operatively coupled to the sensor, the control circuit configured to: read measurements from the sensor at predetermined time intervals; generate and encode a barcode with data representing a first sensor measurement; update and encoding the barcode with data representing the first sensor measurement and the one or more subsequent sensor measurements; and an e-ink interface operatively coupled to the control circuit and configured to display the updated barcode. The sensor may include a gyro sensor or an accelerometer configured to measure movement of the merchandise item.

Figure 1:
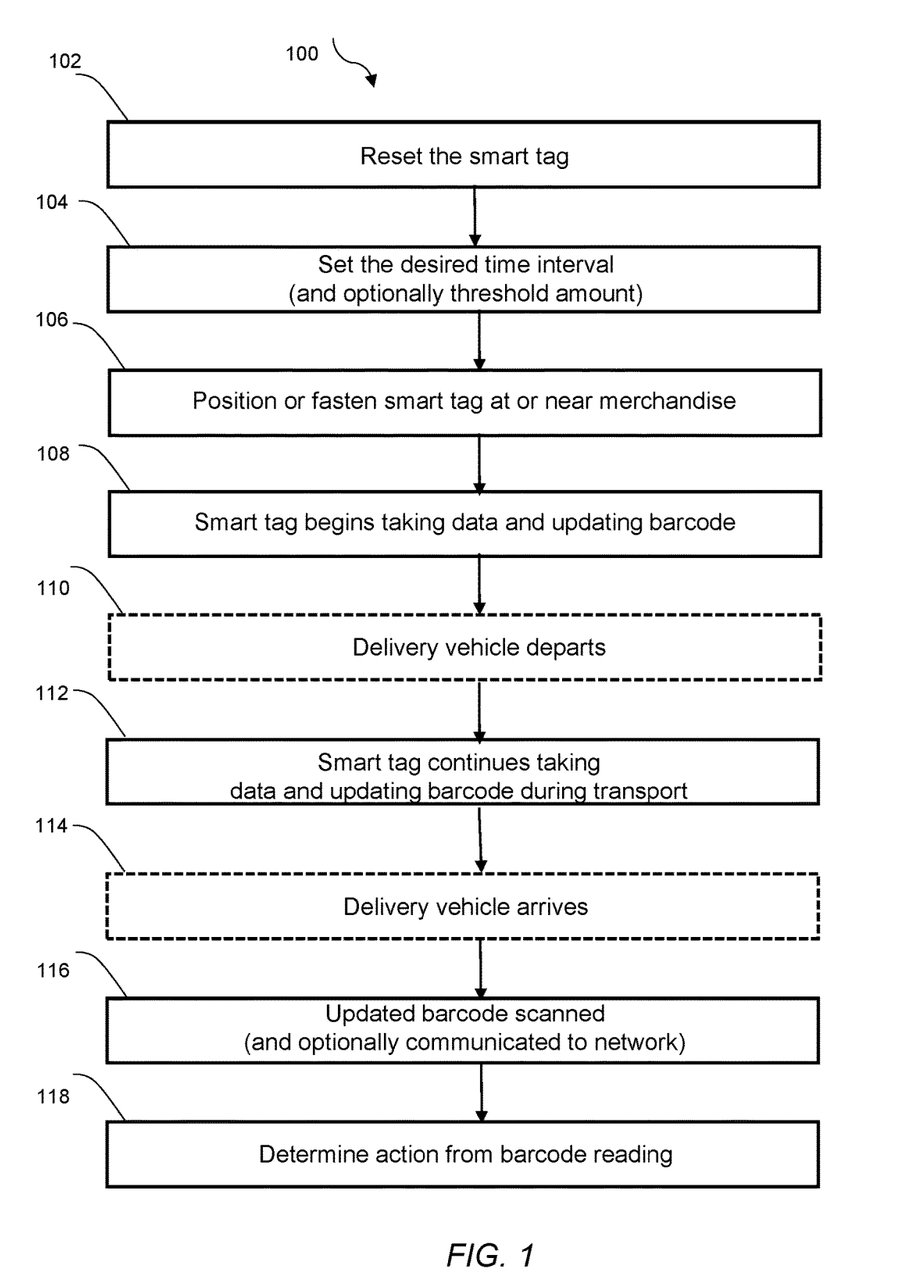
FIG. 1 is a flow diagram in accordance with some embodiments.

Referring to FIG. 1, there is shown a flow diagram for a process 100 for monitoring temperature data of merchandise being transported using a smart tag. As can be seen in the diagram, the process 100 involves encoding and updating the barcode of the smart tag with temperature data at desired time intervals, such as every hour. The process 100 provides a low-cost approach for monitoring sequential temperature measurements of merchandise during transport, such as by a delivery vehicle, and determining temperature compliance at the end of transport. As should be understood, the flow diagram shows a number of steps for ease of comprehension but not all of the steps are necessarily required (and not necessarily in the sequential order shown).

At block 102, the smart tag may be prepared for use. As described in more detail below, the smart tag generally includes a temperature sensor, a control circuit, a power source, and an interface for display of the barcode. It is generally contemplated that the smart tag may have been used previously and that it will need to be reset for re-use. This resetting may involve deleting temperature data currently associated with the smart tag or may involve activating the smart tag. If the smart tag has not been previously used, this resetting step may not be necessary, or it may occur automatically at the time of every new use of the smart tag.

At block 104, the smart tag is set to a desired time interval for taking and recording temperature measurements, such as every hour. This periodic activity will limit the power needs of the smart tag. As should be evident, the time interval may be selected for different time periods depending on the nature of the merchandise being delivered. For example, it may be desirable to take and record temperature measurements more frequently for perishable items with a relatively short shelf life, while taking and recording fewer temperature measurements for items with a longer shelf life. Specific time intervals may be established for different types of merchandise, and the time interval for the smart tag may be configured automatically upon entry of the type of merchandise. As explained further below, by taking and recording temperature measurements at specific time intervals, the encoded data on the barcode will indicate both time and temperature data.

Also, optionally, at this stage, the smart tag may be set to a desired temperature threshold. More specifically, the smart tag may be set so that it has a low temperature threshold and/or a high temperature threshold. As explained further below, in some forms, the smart tag may determine if the measured temperature exceeds, or falls outside, the temperature threshold, how often, and/or by the number of degrees, and the barcode may be encoded with some or all of this data. As used throughout this disclosure, the reference to a measured temperature "exceeding" a temperature threshold means that the measured temperature falls outside of an acceptable temperature range, which can mean that the measured temperature is either above an upper threshold or below a lower threshold. It is not limited to just being above a threshold.

Alternatively, a user may decide to keep the same time interval and/or temperature thresholds from a previous use, so this step may not be necessary. Further, specific temperature threshold(s) may be established for different types of merchandise, and the threshold(s) for the smart tag may be configured automatically upon entry of the type of merchandise.

At block 106, the smart tag is positioned or fastened at or near the merchandise, and this positioning or fastening may occur at any of various times and in any of various ways. As should be evident, this positioning/fastening may occur either before or after the smart tag is reset and/or configured to a desired time interval of temperature measurements (and/or configured to a desired temperature threshold). Further, the smart tag may be positioned/fastened on or near merchandise before or after the merchandise has been loaded onto a delivery vehicle. For example, the smart tag may be installed in a permanent or semi-permanent manner on a pallet supporting a certain type of merchandise or at various locations in the trailer interior of a delivery vehicle. Alternatively, it may be positioned within or amongst the merchandise itself, such as within layers of the product, inside a case of merchandise, or among groups of such items. Further, although the smart tag is addressed in the context of a delivery vehicle, it should be evident that it may be used in other locations and applications where temperature compliance requires monitoring, such as in a storage freezer, refrigerated location, or other temperature sensitive/controlled area.

At block 108, the smart tag is shown beginning to take and record measurements and encode data to a barcode. As should be evident, the smart tag may begin taking measurements and encoding a barcode at any of various times. For example, although the smart tag is shown beginning to perform these actions below the positioning/fastening step (block 106), it should be evident that it can begin performing these action earlier (perhaps when the smart tag is being reset and configured to certain time intervals and/or temperature thresholds—blocks 102 and 104). Where a delivery vehicle is involved, it is generally contemplated that the smart tag will begin performing these actions at or before the delivery vehicle leaves to transport the merchandise.

Blocks 110, 112, and 114 show the operation of the smart tag during transport of the merchandise. At block 110, the delivery vehicle departs. This action is not necessarily part of the process but is shown to give context to the operation of the smart tag. At block 112, the smart tag is reading temperature measurements at desired time intervals and is encoding a barcode with temperature data. As explained further below, the smart tag is preferably updating the barcode with temperature data so that the barcode will include all of the temperature data taken at the selected time intervals (rather than overwriting old temperature data with the most recent temperature data). By encoding and updating the barcode with all of the temperature data, the smart tag can establish cold chain compliance during the entire time of transport. Several examples of ways of encoding the temperature data to the barcode are explained further below. At block 114, the delivery vehicle arrives at its destination, and again, this arrival step is not necessarily part of the process but is shown to give context.

At block 116, the updated barcode is scanned. It is generally contemplated that an individual may scan the updated barcode with a barcode scanner/reader at the delivery point, possibly on the trailer of the delivery vehicle before or as the merchandise is being removed from the trailer. In one form, by reviewing the temperature data at this delivery point, the individual may quickly and easily determine whether the merchandise was maintained within the desired temperature range during the entire time of transport. An individual may use this information to make a determination as to whether the merchandise is acceptable or should be rejected, possibly before the merchandise is removed from the delivery vehicle.

At block 118, the updated barcode data is used to determine an appropriate action. As explained, an individual receiving the merchandise at the delivery point may use this data to determine whether or not to accept some or all of the shipment of merchandise. Alternatively, this data may be communicated to a network for deciphering and analysis and/or may be stored in a database associated with the network.

In another form, process 100 may be modified to monitor movement of merchandise (rather than temperature) during transport by a delivery vehicle. Alternatively, process 100 may be modified to monitor movement in addition to taking temperature measurements during delivery transport. For example, a movement sensor (such as a gyro sensor or an accelerometer) could be added to the smart tag, and the steps of process 100 would be performed in which periodic movement and/or temperature measurements are taken. Steps 102, 104, and 106 might include resetting, configuring, and positioning the smart tag for accepting movement and/or temperature data. Steps 108, 110, 112, and 114 might include initiating movement and/or temperature measurements and continuing these measurements during transport by a delivery vehicle. Steps 116 and 118 might include scanning the updated barcode, optionally communicating the barcode data to a network, and determining further action. Adding a movement sensor (such as a gyro sensor and accelerometer) to the smart tag could be used to provide additional information needed to determine if "sensitive" loads, such as fruits and vegetables, have been compromised in transit. As another example, the movement sensor could monitor a pallet loaded with eggs where large g-forces over time may raise concerns.

In another form, a movement threshold amount could be set by a user at step 104 that would serve to activate the control circuit. In this form, when actual movement of the merchandise exceeds the threshold, the control circuit could record the instance and the severity of the movement (rather than recording every periodic movement). The movement thresholds could be set to determine if the load suffered enough shaking/shifting to justify a compromised quality. This data might be evaluated to reject the merchandise prior to its removal from a delivery vehicle.

Figure 2:
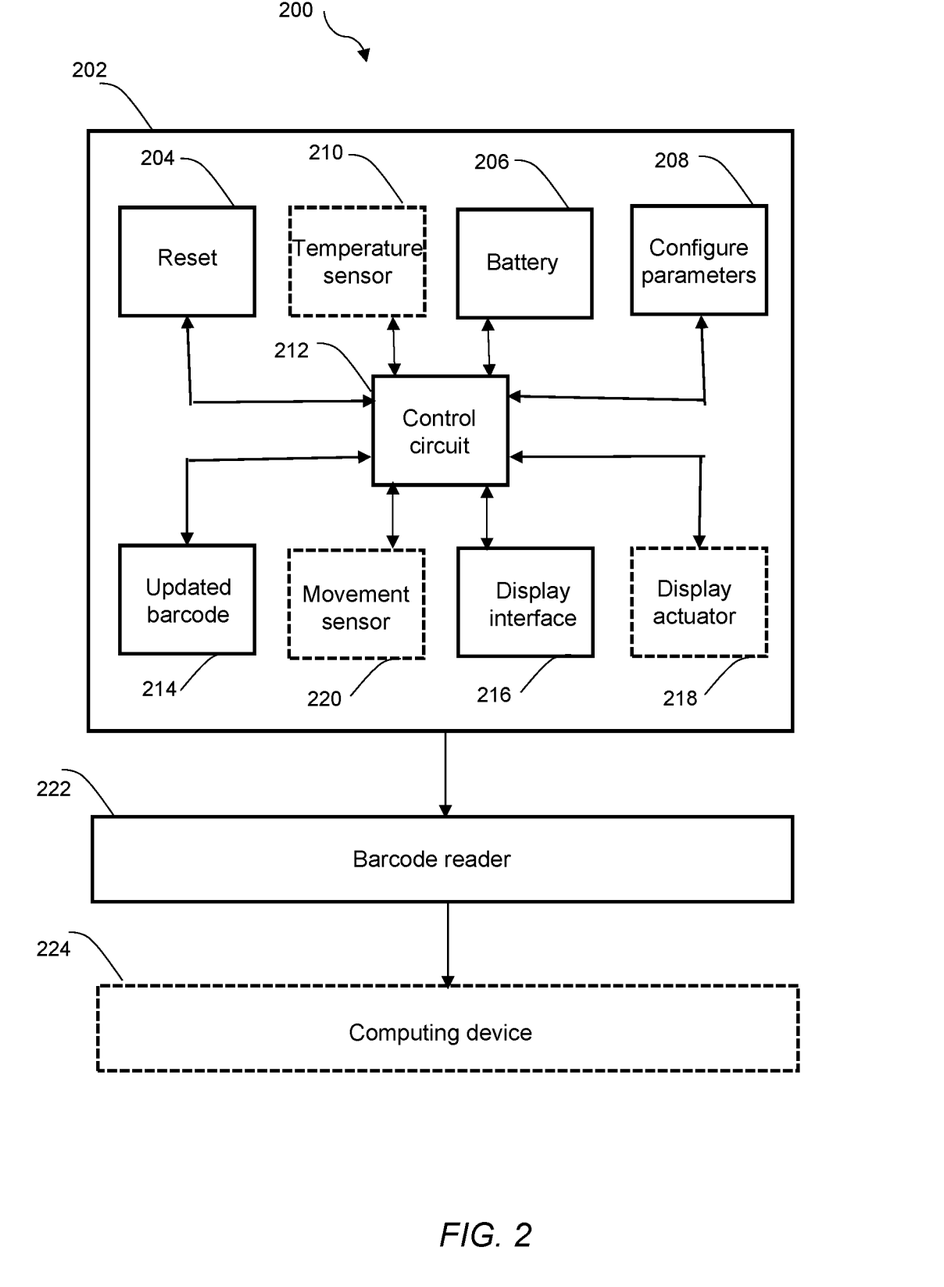
FIG. 2 is a block diagram in accordance with some embodiments.

Referring to FIG. 2, there is shown a block diagram illustrating various components of the system 200. As described above, the system 200 includes a smart tag that displays an updated barcode containing data reflecting a plurality of temperature measurements, preferably a temporal sequence of temperature measurements. The system 200 further shows a barcode scanner to read the updated barcode, and the updated barcode may optionally be transmitted to a central computing device for further action.

FIG. 2 shows a smart tag 202 that may include various components. As described above, the smart tag 202 may include a reset mechanism 204 to prepare the smart tag 202 for operation, which may include deleting past temperature data stored in the smart tag 202. The smart tag 202 includes a battery 206 or other power source suitable for enabling the operation and functioning of the smart tag 202.

Further, the smart tag 202 may include a configuration mechanism 208 to set or to reconfigure certain parameters of the smart tag 202. More specifically, it is contemplated that the time interval of temperature measurements may be adjusted to any of various desired time intervals. This time interval may be reconfigured to different settings depending on the nature of the merchandise being transported. For example, it may be desirable to set a shorter time interval (resulting in more temperature measurements) where the merchandise is especially perishable. Also, it may be desirable to adjust temperature thresholds (possibly high and/or low temperature thresholds) to determine whether temperature measurements fall within or exceed these thresholds. Different types of perishable merchandise have different temperature ranges in which they should be maintained, and the configuration mechanism 208 may be set to the appropriate temperature range for the particular perishable merchandise being transported. Other parameters of the smart tag 202 may also be adjusted.

The smart tag 202 also preferably includes a temperature sensor 210. As described above, the control circuit is configured to take periodic temperature measurements via the temperature sensor 210. The temperature sensor 210 is disposed at or near the merchandise being transported. Any of numerous types of temperature sensors 210 with suitable precision and portability may be used, such as, for example, temperature sensing devices using thermocouples, thermistors, or resistance temperature detectors.

In addition, the smart tag 202 includes a control circuit 212 that is operatively coupled to the other components of the smart tag 202. The term control circuit refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 212 may be configured (for example, by using corresponding programming stored in a memory as will be well understood by those skilled in the art) to carry out one or more of the steps, actions, and/or functions described herein. The control circuit 212 may also be in wireless communication with a central computing device, or network, as described further below.

As can be seen from FIG. 2, the control circuit 212 is operatively coupled to the temperature sensor 210 to take temperature measurements and is preferably coupled to the configuration mechanism 208 to determine the operating parameters. The control circuit is configured to read temperature measurements from the temperature sensor 210 at certain time intervals, which may be set automatically or manually by the configuration mechanism 208 or kept at a fixed internal setting. When there is a first temperature measurement, the control circuit 212 generates and encodes a barcode 214 with data representing a first temperature measurement. Preferably, after each subsequent temperature measurement, the control circuit 212 updates and encodes the barcode 214 with data representing not just the most recent temperature measurement but also the first temperature measurement and any intervening temperature measurements. In this manner, the updated barcode 214 can be read to determine whether there has been temperature compliance during the entire transport time period. Further, the control circuit is operatively coupled to an interface 216 that displays the updated barcode 214.

The updated barcode 214 may be any of various barcode types. It is generally contemplated that one dimensional (1D), two dimensional (2D), or three dimensional (3D) barcodes may be used with the smart tag 202. As should be evident, a 1D barcode (or traditional, linear barcode) generally refers to a barcode composed of lines of varying widths separated by variable spacing to form a particular pattern and is read in one dimension, a 2D barcode (or matrix barcode) generally represents data encoded horizontally and vertically and can encode more data than a 1D barcode, and a 3D barcode generally includes an additional, third dimension (such as height or color). The available data from a 1D barcode may be dictated by the length of the label, and in some instances, may only have 25 digits of information. In contrast, 2D barcodes (such as QR codes) can store quite a significant amount of data.

In one form, the updated barcode 214 may be a 2D barcode that is updated with periodic temperature measurements ("temperature model"). One way of encoding the data is to represent each temperature measurement in the updated barcode as a four digit value with one digit indicating a positive or negative value of the temperature measurement and the other three digits indicating an absolute value of the temperature measurement. So, for example, at time $T_0$, the four digit value may be "+067" (indicating a temperature of 67° F.), and then at time $T_1$, the four digit value may be "+070" (indicating a temperature of 70° F.). After time $T_1$, the data would be encoded with both values "+067+070," in order to include both temperature measurements. In this way, the barcode is updated after each temperature measurement to add data representing the most recent temperature measurement. In other words, after each subsequent time period, an additional four digit value would be added to the updated barcode (without overwriting the other data), i.e., the updated barcode preferably puts the data in a string form. Thus, over time, the updated barcode includes data representing a plurality of sequential temperature measurements taken at the predetermined time intervals from the first temperature measurement to a last temperature measurement.

This data encoding example may be modified to include a fifth digit for each temperature measurement that makes use of a temperature threshold. More specifically, the control circuit may be configured to compare each temperature measurement to a predetermined temperature threshold, and the fifth digit may be used to keep a running total of the number of instances that the predetermined temperature threshold has been exceeded. So, in the example above, the predetermined threshold may be set to 65° F., in which case both of the temperature measurements would exceed the threshold. In this modified example, at time $T_0$, the five digit value may be "+0671" (indicating a temperature of 67° F. and one instance where the temperature threshold was exceeded), and then at time $T_1$, the five digit value may be "+0702" (indicating a temperature of 70° F. and a second instance where the temperature threshold was exceeded). After time $T_1$, the data would be encoded with the sequence "+0671+0702." Of course, the data may be encoded in the updated barcode in any of a number of ways. Generally, it is desirable to be able to track the entire sequence of temperature measurements in order to confirm cold chain compliance, i.e., that the temperature has been within a desired range for the entire time period being monitored.

In these examples, temperature measurements have been indicated in Fahrenheit. Of course, it should be understood the temperature may also be measured in accordance with other temperature scales, such as Celsius or Kelvin. In other words, the updated barcode may be encoded with a series of digits representing temperature measurements in Celsius, Kelvin, etc. Measuring the temperature in Kelvin would eliminate the need for an initial digit representing a "+" or "−" value.

In another form, the updated barcode 214 may be a 1D barcode that is updated with more compact data representing the periodic temperature measurements relative to temperature threshold(s) ("fluctuation model"). In this form, a 1D barcode could be used in which the data is inputted in a smaller, less informative format to fit on the barcode. For example, each temperature measurement could be encoded as a one digit value indicating the amount that a temperature measurement exceeds a certain threshold. So, in the modified example about, at time $T_0$, the one digit value may be "2" (indicating a difference of 2° F. between the measured temperature of 67° F. and the threshold of 65° F.), and then at time $T_1$, the one digit value may be "5" (indicating a difference of 5° F. between the measured temperature of 70° F. and the threshold of 65° F.). After time $T_1$, the data would be encoded with the sequence "25." If the measured temperature is within the desired temperature range (such as 65° F. or any temperature below 65° F.), the one digit value may be "0." So, the control circuit is configured to compare each temperature measurement to a predetermined temperature threshold and encode an updated barcode with data representing a sequence of digits indicating the amount each temperature measurement exceeded the predetermined temperature threshold. Also, the control circuit may be configured so that the one digit value represents a range that the temperature threshold is exceeded. So, for example, a "1" may indicate a range of 1-5° F., "2" may indicate a range of 6-10° F., and so on.

In a modified form, a 1D barcode could be used to indicate temperature measurements above a high threshold and below a low threshold. For example, even numbers could be used to indicate the amount a measured temperature exceeds a high temperature threshold, while odd numbers could be used to indicate the amount a measured temperature exceeds a low temperature threshold. Further, as in the example above, the digit "0" could indicate no deviation outside the threshold(s), and each digit could correspond to a certain range of temperatures above or below the threshold(s). Each recorded digit on the barcode represents a time interval between temperature readings, and the total number of digits in the string multiplied by the set time interval would indicate the total monitoring time. Again, these are just some examples of the use of a 1D barcode, and the data may be encoded on the 1D barcode in any of a number of ways.

The updated barcode 214 is shown on display interface 216 that is coupled to the control circuit 212. The interface 216 is preferably an e-ink (or electronic ink) interface that imitates the appearance of ink on a paper or a physical label. This e-ink interface shows a current barcode and, at a later time, displays a new barcode that has been updated with new temperature data. An advantage provided by an e-ink interface is that it overwrites a current barcode with an updated one on the same display. It does not have the disadvantage of some of the traditional media for barcodes (i.e., paper or a physical label) where new material is required to display each new barcode. In this way, the display interface 216 may be updated with a current barcode that includes all of the sequential temperature data. The current barcode may be displayed continuously on the display interface 216 until it is updated with the new barcode, or the current barcode may be displayed in response to a user actuating a display actuator 218. The actuator 218 is operatively coupled to the interface 216 to cause the interface 216 to display the updated barcode 214 in response to the actuator 218.

The smart tag 202 may also include a movement sensor 220, such as a gyro sensor or accelerometer, to observe movement of merchandise during delivery by a vehicle. This movement sensor 220 may be used in lieu of (or in addition to) the temperature sensor 210. The control circuit 214 may be set and configured to take movement sensor readings at predetermined time intervals (like temperature sensor readings). Movement sensor measurements could be encoded in a barcode in a manner similar to that for temperature measurements, as described above. The barcode could then be read to evaluate all of the movement data during the entire delivery transport. Optionally, a user may input movement thresholds into the smart tag 202 and only movement data exceeding the threshold might be recorded.

In one form, both temperature and movement data could be integrated into a single barcode. For example, at $T_0$, a 2D barcode might include a 4-digit value representing temperature data followed by a 1-digit value representing whether the movement of the merchandise exceeded a certain threshold. Each subsequent time interval would then generate a new 5-digit value to be added to a data string from the previous time intervals. Alternatively, in another form, multiple smart tags might be used: one tag being suitable for monitoring temperature data while a second tag is suitable for monitoring movement data.

As shown in FIG. 2, the data from the updated barcode 214 is read by a barcode reader 222. It is contemplated that the barcode reader 222 may be part of a traditional barcode scanner device of may be a component or application of a mobile device, such as a smartphone. Further, it is contemplated that the updated barcode 214 may be read at or near at a delivery drop-off point for a delivery vehicle. In one form, a user may readily utilize a portable barcode reader 222 to quickly determine cold chain compliance or movement compliance by the merchandise at delivery vehicle, prior to unloading the merchandise. This use of updated barcode 214 and barcode reader 222 provides a straightforward approach with a relatively low cost of implementation. In one form, it is contemplated that the data need not be transmitted to a network or computing device for further evaluation. In this form, it may be desirable to avoid storing unnecessary information. If the data shown on the updated barcode 214 appears good or satisfactory, then the merchandise is in compliance. This approach has the advantage of averting the need for network involvement and significant data logging and storage.

However, in another form, it may be desirable to transmit the data from the updated barcode 214 to a network or computing device 224. The barcode reader 222 may be part of a device, such as a mobile device, that allows transmission of the data or that is otherwise in communication with the computing device 224. Alternatively, the smart tag 202 may be equipped with a transmitter to transmit the updated barcode 214 to the computing device 224. In turn, the computing device 224 may be configured to decipher the temperature and/or movement measurements in the updated barcode and to create a task if one or more of the temperature and/or movement measurements indicate that a predetermined threshold was exceeded. For example, the network or central computing device may instruct rejection of the merchandise if a threshold is exceeded or may store the temperature and/or movement data in a database. This stored data may be evaluated to determine any specific concerns or trends, such as, for example, multiple instances of lack of cold chain compliance by a particular delivery vehicle or company, along a particular delivery route, or by a particular type of perishable merchandise.

In summary, in one form, an e-ink label smart tag capable of capturing temperature may be placed in a delivery vehicle trailer, in a merchandise container, or on the merchandise itself. At set time intervals, the smart tag will take a temperature reading and update a barcode. The encoding of the barcode may be accomplished according to any of various algorithms and represents time and temperature. A device may then be used to scan the smart tag and interpret the temperature over time and display to the inspecting individual whether the item or group of items or load are within cold chain compliance. This may be integrated into the delivery vehicle check in process.

The method for determining whether an item, group of items, or trailer of items are within or outside of cold chain compliance may be based on what temperature the items are to be stored at and the frequency of and duration of temperatures outside of that range, according to various prescribed requirements. These requirements may be based on the number of degrees, the frequency, and the length of time the one or more temperature measurement(s) exceeded the predetermined temperature threshold. For example, one requirement may be that a frozen item cannot be above a freezing temperature for more than twenty minutes and that the total number of events outside of the freezing temperature greater than a three minute exposure cannot exceed three per day. Additionally, the total amount of deviation above or below a temperature threshold may be considered within the determination. As another example, exceeding twice the temperature threshold may be acceptable if the exposure time period is ten minutes but any exposure exceeding three times the threshold may result in automatic failure. The same factors and approach may be considered for items that are chilled, not frozen. Additionally, multiple smart tags may be used to determine if parts of a load or parts of a group of items are in compliance and others need to be rejected. Further, gaps in cold chain distribution may be identified by multiple instances where measured temperature exceeded the threshold(s). These determinations may be made by an individual with a device, such as a mobile device or barcode scanner, at the delivery point or by a network or computing device that may be more remote from the delivery point.

There are many additional applications for these smart tags. For instance, when setting multiple smart tags, the smart tags may assigned in groups or clusters to various zones. Within a delivery vehicle or temperature controlled location, there may be some variations in temperature at different locations, i.e., zone temperatures. When taking measurements, such as during unloading of the delivery vehicle, each single smart tag may be scanned representing the group or cluster. The individuals unloading the delivery vehicle may decide to keep the merchandise that maintains compliance and to reject the ones on the delivery vehicle that do not maintain compliance. Alternatively, if some smart tags show a lack of compliance, a deeper audit may be undertaken for quality assurance purposes and the need to discern whether the whole shipment may be compromised or if just unique zones are compromised.

Further, different smart tags can be weighted for "reasonability." For example, a smart tag near the door of the delivery vehicle or temperature controlled location might have a greater tolerance than the smart tag furthest from the door or in the center of a container of merchandise. In addition, multiple zones and smart tags can be used to direct an individual to precisely how deep into the delivery vehicle or temperature controlled location an audit needs to occur. Another possible feature would be to use temperature information to increase or decrease cooling on demand to zones that need it if the delivery vehicle or temperature controlled storage area or location is equipped with multiple cooling ports or outputs.

Figure 3:
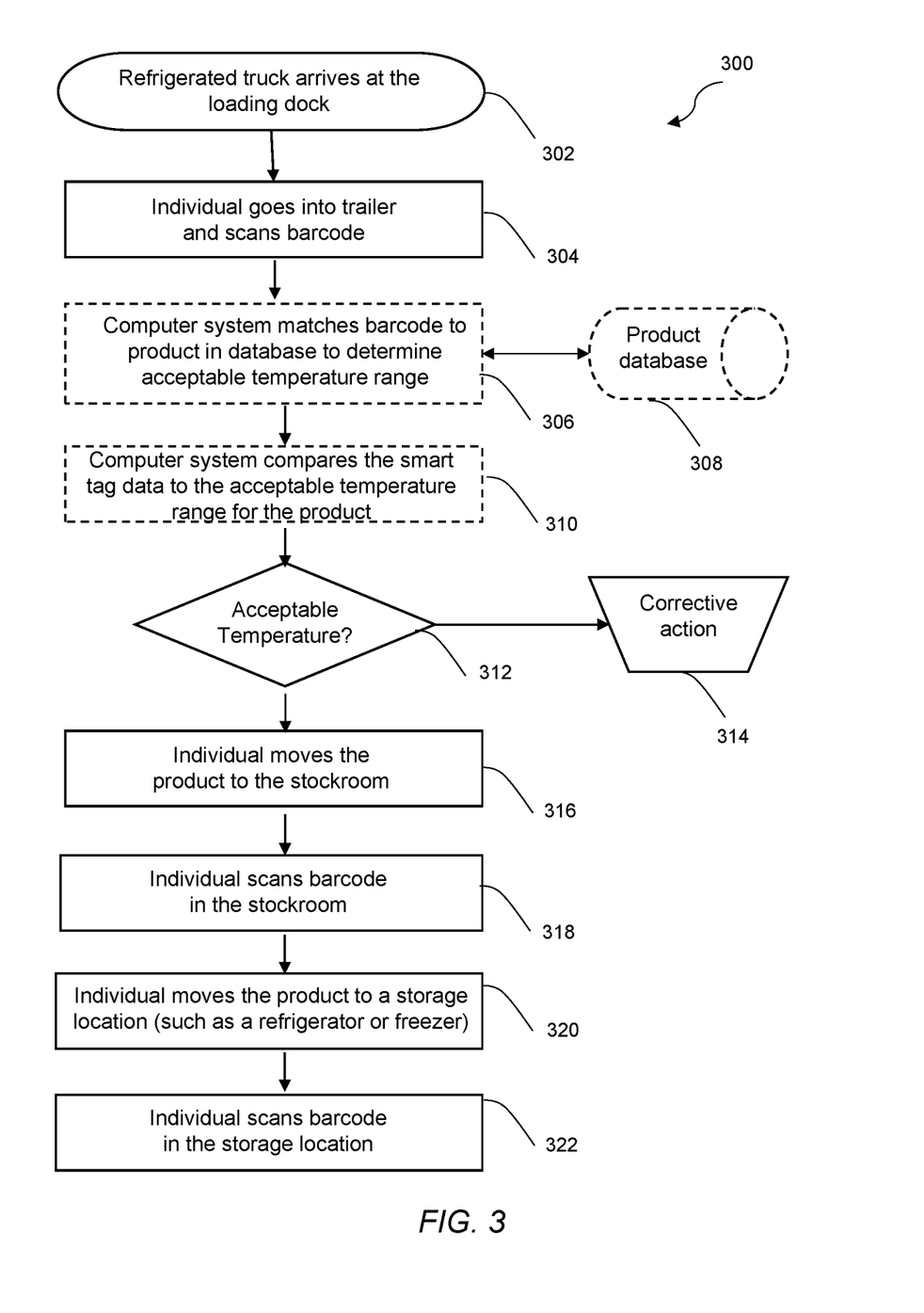
FIG. 3 is a flow diagram in accordance with several embodiments.

Referring to FIG. 3, there is shown a flow diagram for another process 300 for monitoring temperature data of merchandise being transported. As can be seen in the diagram, the process 300 shows the monitoring of temperature data using a smart tag during and after delivery. More specifically, the process 300 shows the monitoring of temperature compliance when the delivery vehicle arrives at the delivery point, as the merchandise is unloaded, and after storage of the merchandise in a storage location. This process 300 makes evident that this disclosure is not limited to monitoring temperature during delivery transport. As should be understood, the flow diagram shows a number of steps but all of the steps are not necessarily required.

At block 302, the delivery vehicle (in the form of a refrigerated truck) arrives at the loading dock of a shopping facility. It is contemplated that, in one form, the in-transit temperature data is evaluated at or near the loading dock in order to possibly make decisions regarding acceptance or rejection of products prior to unloading. As addressed above, one or more smart tags may be used, and they may be mounted on or near the products or containers holding the merchandise.

At block 304, an individual goes into the trailer of the refrigerated truck and scans the barcode(s) of the smart tag(s). In one form, it is contemplated that the individual uses a mobile device (such as a traditional barcode scanner or a smartphone) to read the barcode(s) of the smart tag(s). As addressed above, the barcode preferably includes data reflecting sequential temperature measurements (and/or possibly movement measurements).

At block 306, a computer system matches the barcode of the product with the appropriate product type in a database to determine the acceptable temperature range for the product. As can be seen at block 308, the computer system utilizes a product database to accomplish this match. In one form, it is contemplated that the computer system may be part of the mobile device of the individual and that the product database may be stored on the mobile device. In another form, it is contemplated that the mobile device is in wireless communication with the product database via a remote computer system. Regardless, in either form, a product database is accessible to determine the acceptable temperature range and thresholds for a particular type of product. It should be understood that this match to a database is an optional step, and it is contemplated that an individual may be aware of the acceptable temperature range for the product.

At block 310, the computer system compares the smart tag data to the acceptable temperature range for the particular product. At block 312, the process 300 proceeds along two routes depending on whether the actual measured temperature is within the acceptable range. If not within the acceptable range, some correction action may be taken, as shown at block 314. For example, this may include rejection of some or all of the products. If within the acceptable range, the individual may accept some or all of the products and may proceed with the unloading of the products. In one setup, scanning of barcode(s) on smart tag(s) that are mounted to or in the trailer might finalize the trailer.

At block 316, the unloading process continues, and the individual may move the product to the stockroom of the shopping facility. As the individual moves the product from the trailer to the stockroom and then to storage locations, the smart tag(s) that are placed on the pallets and/or the product continues to collect data at set time intervals. If the smart tags used during delivery were part of the trailer, new smart tags or barcode devices may be used to continue monitoring temperature. It is contemplated that, in one form, a single smart tag/barcode device may remain with the product during the entire delivery and unloading process. Alternatively, a first smart tag/barcode device may be used during delivery and then a second, new smart tag/barcode device may be disposed on or about the product after delivery for continued monitoring of temperature data.

In one form, as shown at block 318, the individual may again scan the barcode to determine the temperature data during unloading, possibly to start a new smart tag using a new barcode device. It may also be desirable to monitor temperature in the stockroom outside of the environment of the trailer and prior to movement of a storage location. As should be evident, the individual may optionally scan the barcode at any of various stages before, during, and after movement of the products from the refrigerated truck to a storage area or location.

Additional tasks may be performed during the unloading process. For example, if any smart tag is low enough on battery power such that it needs to be changed, then a flag may be injected into the barcode. The battery is operatively coupled to the control circuit, and the control circuit may be configured to update the barcode with data indicating a low power condition of the battery. The barcode format may be modified to include an additional digit indicating low battery power. The mobile device and associated software can inform the unloader that the smart tag needs to be serviced. In addition, user identification information can be collected at this stage so that specific individuals are assigned responsibility to ensure that smart tags remain functional.

At block 320, the individual moves the product to the storage areas or locations, such as a refrigerator or freezer at the shopping facility. Multiple smart tags may be used at zones about the storage area or location to monitor temperature. The product may be stored at these locations for an indeterminate amount of time. At block 322, an individual may continue the monitoring of temperature data by scanning the barcode in the refrigerator or freezer, such as after unloading has been completed. Upon placing the product in the cooler or freezer, the individual may scan the product or pallet barcode to confirm that the individual removed the product from the trailer and placed it in the cooler or freezer.

Scanning may be continued as desired thereafter. In this way, cold chain compliance can be maintained. This process 300 allows the temperature of the merchandise to be monitored in an uninterrupted manner from the start of transport (or even before), through the entire course of transit, through the unloading process, and for an indeterminate amount of time after movement to a storage location. Time, temperature, and activity data can be evaluated to plot the cold chain of the product and identify weak points in the delivery, unloading, and storage process.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for monitoring the temperature of merchandise items comprising:
    a temperature sensor disposed at or near one or more merchandise items;
    a control circuit operatively coupled to the temperature sensor, the control circuit configured to:
        read temperature measurements from the temperature sensor at predetermined time intervals;
        generate and encode a barcode with data representing a first temperature measurement;
        update and encode the barcode with data representing the first temperature measurement and one or more subsequent temperature measurements corresponding to the temperature measurements taken by the temperature sensor at the predetermined time intervals;
        the barcode being updated after each temperature measurement to add data representing a most recent temperature measurement and the updated barcode comprising data representing a plurality of sequential temperature measurements taken at the predetermined time intervals from the first temperature measurement to the most recent temperature measurement; and
    an interface disposed at or near the one or more merchandise items and operatively coupled to the control circuit and configured to display the updated barcode, the interface comprising a display configured to periodically display barcodes on the same display at or near the one or more merchandise items and to overwrite a barcode with an updated barcode comprising data representing the plurality of sequential temperature measurements.

2. The system of claim 1, wherein each temperature measurement in the updated barcode is represented as a four digit value, one digit indicating a positive or negative value of the temperature measurement and the other three digits indicating an absolute value of the temperature measurement.

3. The system of claim 2, wherein the control circuit is configured to compare each temperature measurement to a predetermined temperature threshold and wherein each temperature measurement representation comprises an additional fifth digit indicating the number of instances that the predetermined temperature threshold has been exceeded.

4. The system of claim 1, wherein the control circuit is configured to compare each temperature measurement to a predetermined temperature threshold and wherein the updated barcode comprises data representing a sequence of digits indicating the amount each temperature measurement exceeded the predetermined temperature threshold.

5. The system of claim 1, further comprising a barcode reader configured to read the updated barcode locally at or near the one or more merchandise items to determine the data representing the plurality of sequential temperature measurements without transmission to a remote computing device.

6. The system of claim 1, further comprising a barcode reader configured to read the updated barcode and to transmit it to a computing device in communication with the barcode reader, wherein the computing device is configured to decipher the temperature measurements in the updated barcode and to create a task if one or more of the temperature measurements indicate that a predetermined temperature threshold was exceeded.

7. The system of claim 1, further comprising an actuator operatively coupled to the interface to cause the interface to display the updated barcode in response to the actuator.

8. The system of claim 1, further comprising a battery operatively coupled to the control circuit, wherein the control circuit is configured to update the barcode with data indicating a low power condition of the battery.

9. A method for monitoring the temperature of merchandise items comprising:
    by a temperature sensor at or near one or more merchandise items, measuring temperature at predetermined time intervals;
    by a control circuit, generating and encoding a barcode with data representing a first temperature measurement;
    by a control circuit, updating and encoding the barcode with data representing the first temperature measurement and one or more subsequent temperature measurements corresponding to the temperature measurements taken by the temperature sensor at the predetermined time intervals;
    the barcode being updated after each temperature measurement to add data representing a most recent temperature measurement and the updated barcode comprising data representing a plurality of sequential temperature measurements taken at the predetermined time intervals from the first temperature measurement to the most recent temperature measurement; and
    by an interface disposed at or near the one or more merchandise items and operatively coupled to the control circuit, displaying the updated barcode, the interface comprising a display configured to periodically display barcodes on the same display at or near the one or more merchandise items and to overwrite a barcode with an updated barcode comprising data representing the plurality of sequential temperature measurements.

10. The method of claim 9, further comprising providing the control circuit and configuring it to receive temperature measurements according to a predetermined time interval.

11. The method of claim 9, further comprising determining whether one or more of the temperature measurements exceeded a predetermined temperature threshold.

12. The method of claim 11, further comprising determining information from the group consisting of: the number of degrees, the frequency, and the length of time the one or more temperature measurements exceeded the predetermined temperature threshold.

13. The method of claim 9, further comprising:
scanning the updated barcode with a barcode reader; and
transmitting the updated barcode to a computing device in communication with the barcode reader; and
deciphering the temperature measurements in the updated barcode and creating a task if one or more of the temperature measurements indicate that a predetermined temperature threshold was exceeded.

14. The method of claim 9, further comprising:
providing a plurality of temperature sensors at predetermined locations in a storage area;
measuring temperature at the predetermined time intervals at the predetermined locations in the storage area;
by one or more control circuits, generating and encoding a plurality of barcodes with data representing a first temperature measurement at each predetermined location; and
by one or more control circuits, updating and encoding the plurality of barcodes with data representing the first temperature measurement and one or more subsequent temperature measurements at each predetermined location.

15. The method of claim 14, further comprising increasing or decreasing cooling to one or more of the predetermined locations in response to the temperature measurements.

16. The method of claim 9, further comprising:
scanning the updated barcode of the one or more merchandise items at the time of delivery by a delivery vehicle;
continuing to measure temperature at predetermined time intervals following delivery;
continuing to update and encode the barcode with data representing temperature measurements following delivery; and
scanning the updated barcode following movement to a storage area.

17. The method of claim 9, further comprising:
generating and encoding a first updated barcode with a first barcode device;
scanning the first updated barcode at the time of delivery by a delivery vehicle;
measuring temperature at predetermined time intervals following delivery;
updating and encoding a second barcode with data representing temperature measurements following delivery with a second, different barcode device; and
scanning the updated second barcode following movement to a storage area.

18. A system for monitoring the movement of merchandise items, the system comprising:
a sensor disposed on a merchandise item measuring movement;
a control circuit operatively coupled to the sensor, the control circuit configured to:
read measurements from the sensor at predetermined time intervals;
generate and encode a barcode with data representing a first sensor measurement;
update and encoding the barcode with data representing the first sensor measurement and the one or more subsequent sensor measurements corresponding to the sensor measurements taken by the sensor at the predetermined time intervals;
the barcode being updated after each sensor measurement to add data representing a most recent sensor measurement and the updated barcode comprising data representing a plurality of sequential sensor measurements taken at the predetermined time intervals from the first sensor measurement to the most recent sensor measurement; and
an e-ink interface disposed at or near the one or more merchandise items and operatively coupled to the control circuit and configured to display the updated barcode, the interface comprising a display configured to periodically display barcodes on the same display at or near the one or more merchandise items and to overwrite a barcode with an updated barcode comprising data representing the plurality of sequential sensor measurements.

19. The system of claim 18, wherein the sensor comprises one or more of a gyro sensor and an accelerometer configured to measure movement of the merchandise item.

* * * * *